United States Patent
Kang et al.

(10) Patent No.: US 11,402,908 B2
(45) Date of Patent: Aug. 2, 2022

(54) APPARATUS AND METHOD FOR SELECTING ITEM USING BRAIN WAVE

(71) Applicants: HYUNDAI MOTOR COMPANY, Seoul (KR); KIA MOTORS CORPORATION, Seoul (KR); SOOKMYUNG WOMEN'S UNIVERSITY INDUSTRY-ACADEMIC COOPERATION FOUNDATION, Seoul (KR)

(72) Inventors: Jeong Su Kang, Seongnam-si (KR); Suh Yeon Dong, Seoul (KR)

(73) Assignees: HYUNDAI MOTOR COMPANY, Seoul (KR); KIA MOTORS CORPORATION, Seoul (KR); SOOKMYUNG WOMEN'S UNIVERSITY INDUSTRY—ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/026,674

(22) Filed: Sep. 21, 2020

(65) Prior Publication Data

US 2021/0117000 A1 Apr. 22, 2021

(30) Foreign Application Priority Data

Oct. 18, 2019 (KR) .................. 10-2019-0129730

(51) Int. Cl.
*G06F 3/01* (2006.01)
*G06F 3/0482* (2013.01)
*G06V 20/59* (2022.01)

(52) U.S. Cl.
CPC ............ *G06F 3/015* (2013.01); *G06F 3/0482* (2013.01); *G06V 20/59* (2022.01)

(58) Field of Classification Search
CPC .... G06F 3/015; G06F 3/0482; G06F 3/04842; G06K 9/00832; G06K 9/00536; B60K 2370/115; B60K 2370/152; B60K 2370/589; B60K 2370/592; B60K 37/06; B60K 35/00; B60W 40/08; B60W 50/10;
(Continued)

(56) References Cited

U.S. PATENT DOCUMENTS

2014/0347265 A1* 11/2014 Aimone ................ H04W 4/029
345/156
2015/0313496 A1* 11/2015 Connor ................ A61B 5/6814
600/301

(Continued)

*Primary Examiner* — Alexander Eisen
*Assistant Examiner* — Kebede T Teshome
(74) *Attorney, Agent, or Firm* — Lempia Summerfield Katz LLC

(57) ABSTRACT

An apparatus and a method for selecting an item using a brain wave signal are disclosed. The method for selecting an item includes: receiving, by a receiver, information on at least one item from a service point; displaying, by a display, the received information on a predetermined area in a mobility; in response to the displayed information, collecting, by a sensor, a brain wave signal for at least one passenger in the mobility for a predetermined time; and determining, by a controller, the passenger's choice by analyzing the collected brain wave signal.

18 Claims, 12 Drawing Sheets

(58) Field of Classification Search
CPC ......... B60W 50/14; B60W 2040/0872; B60W 2050/146; B60W 2556/45; G06Q 30/0601
See application file for complete search history.

(56) References Cited

U.S. PATENT DOCUMENTS

2019/0011918 A1* 1/2019 Son .................. G01C 21/362
2020/0272829 A1* 8/2020 Hamagami ........ G06K 9/00832

* cited by examiner

-9.3μN                -0.6μN

-1.8μN                 13.0μN

APPARATUS AND METHOD FOR SELECTING ITEM USING BRAIN WAVE

CROSS REFERENCE TO RELATED APPLICATION

This application claims priority to and the benefit of Korean Patent Application No. 10-2019-0129730, filed Oct. 18, 2019, the entire contents of which are incorporated herein by reference.

FIELD

The present disclosure relates to a mobility controlling method and apparatus.

BACKGROUND

The statements in this section merely provide background information related to the present disclosure and may not constitute prior art.

As one of the transport means, a vehicle (or mobility) is a very important means and tool for living a life in the modern world. Furthermore, a vehicle itself may be regarded as something special that gives meaning to someone.

As technology is advanced, functions provided by a vehicle also gradually evolve. For example, in recent years, vehicles not only transport a passenger to a destination, but also meet a passenger's needs for faster and safer travel to a destination. In addition, new devices are being added to a vehicle system in order to satisfy a passenger's aesthetic taste and comfort. In addition, the existing devices like steering wheels, transmissions and acceleration/deceleration devices are also being developed so that more functions can be provided to users.

Meanwhile, a brain-computer interface or a brain-machine interface is a field of controlling a computer or a machine according to a person's intention by using brain wave signals. ERP (Event-Related Potential) is closely related to cognitive functions.

SUMMARY

The present disclosure provides an apparatus and method for selecting an item on the basis of a passenger's brain wave signal.

The present disclosure provides an apparatus and method for selecting an item in a mobility on the basis of a passenger's steady-state visually evoked potentials (SS-VEPs).

The technical objects of the present disclosure are not limited to the above-mentioned technical objects, and other technical objects that are not mentioned will be clearly understood by those skilled in the art through the following descriptions.

In one form of the present disclosure, an apparatus for selecting an item by using a brain wave signal may include: a receiver for receiving information on at least one item from a service point, a display for displaying the received information on a predetermined area in a mobility, a sensor for collecting a brain wave signal as a response to the displayed information for at least one passenger in the mobility for a predetermined time, and a controller for determining the passenger's choice by analyzing the collected brain wave signal.

The brain wave signal may include steady-state visually evoked potentials (SSVEPs).

The service point may be a place providing a driver through (DT) service within a predetermined range from the mobility.

When transmission and reception between the mobility and the service point are based on a local network, the predetermined range may be a range where the local network enables transmission and reception.

The item may be at least one of an article provided by the service point, a service provided by the service point, or information on the service point.

Information on the item may be at least one of an image of item, a type of item, a price of item, the number of items, a name of item, a new menu, an event, or a discount, which are provided by the service point.

The predetermined area may be a predetermined area within a display that can be projected in the mobility.

The predetermined area may be a predetermined area on a front windshield, a side windshield, a rear windshield, and a projection display that is different from the windshields.

At least one of a form and a size of the predetermined area may be determined based on the information on the item.

The predetermined area may be determined based on at least one of a position of the passenger and a position of the passenger's gaze while the mobility is running.

The display may display the received information on item on a predetermined area in a mobility on the basis of a predetermined frequency.

The predetermined frequency may include at least one piece of information among an output frequency, a frequency output pattern, and output duration.

The output frequency may be differently set according to information on an item displayed on the predetermined area.

The analysis may compare an amplitude of SSVEP collected for the predetermined time and a predetermined threshold.

The threshold may be determined based on an output frequency of the SSVEP.

The controller may control the mobility or transmit predetermined information to the service point on the basis of the determined choice of the passenger.

The controller may further perform a process of checking whether or not the determined choice of the passenger meets the passenger's intention.

In addition, according to the present disclosure, a method for selecting an item by using a brain wave signal may be provided. The method may include: receiving, by a receiver, information on at least one item from a service point; displaying, by a display, the received information on a predetermined area in a mobility; collecting, by a sensor, a brain wave signal as a response to the displayed information for at least one passenger in the mobility for a predetermined time; and determining, by a controller, the passenger's choice by analyzing the collected brain wave signal.

The brain wave signal may include steady-state visually evoked potentials (SSVEPs).

The service point may be a place providing a driver through (DT) service within a predetermined range from the mobility.

When transmission and reception between the mobility and the service point are based on a local network, the predetermined range may be a range where the local network enables transmission and reception.

The item may be at least one of an article provided by the service point, a service provided by the service point, and information on the service point.

Information on the item may be at least one of an image of item, a type of item, a price of item, the number of items, a name of item, a new menu, an event, or a discount, which are provided by the service point.

The predetermined area may be a predetermined area within a display that can be projected in the mobility.

The predetermined area may be a predetermined area on a front windshield, a side windshield, a rear windshield, and a projection display that is different from the windshields.

At least one of a form and a size of the predetermined area may be determined based on the information on the item.

The predetermined area may be determined based on at least one of a position of the passenger and a position of the passenger's gaze while the mobility is running.

The displaying step may include a step of displaying the received information on item on a predetermined area in a mobility on the basis of a predetermined frequency.

The predetermined frequency may include at least one piece of information among an output frequency, a frequency output pattern, and output duration.

The output frequency may be differently set according to information on an item displayed on the predetermined area.

The analysis may compare an amplitude of SSVEP collected for the predetermined time and a predetermined threshold.

The threshold may be determined based on an output frequency of the SSVEP.

The method may further include a step of controlling the mobility or transmitting predetermined information to the service point on the basis of the determined choice of the passenger.

The method may further include a step of checking whether or not the determined choice of the passenger meets the passenger's intention.

The features briefly summarized above with respect to the present disclosure are merely exemplary aspects of the detailed description below of the present disclosure, and do not limit the scope of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
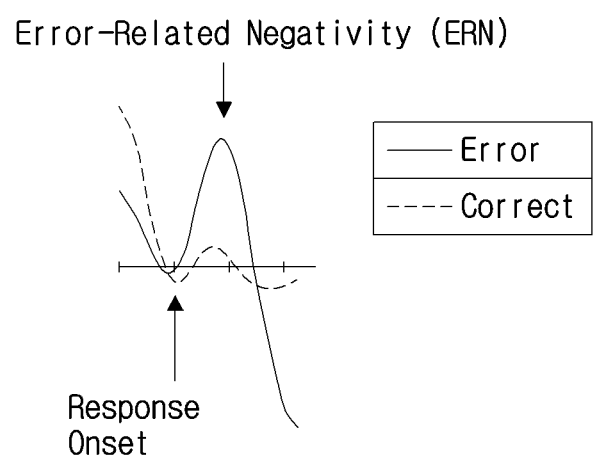
FIG. 1 is a view illustrating a general waveform of ERN in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary forms.

In describing forms of the present disclosure, well-known functions or constructions will not be described in detail when they may obscure the spirit of the present disclosure.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure. Also, the terms, such as 'unit' or 'module', etc., should be understood as a unit that processes at least one function or operation and that may be embodied in a hardware manner (e.g., a processor), a software manner, or a combination of the hardware manner and the software manner.

In the present disclosure, all of the constituent elements described in various forms should not be construed as being essential elements but some of the constituent elements may be optional elements. Accordingly, forms configured by respective subsets of constituent elements in a certain form also may fall within the scope of the present disclosure. In addition, forms configured by adding one or more elements to various elements also may fall within the scope of the present disclosure.

As an electrical activity of neurons constituting a brain, a brain wave signal (or brain signal, brain wave) means a bio signal that directly and indirectly reflects a conscious or nonconscious state of a person. A brain wave signal can be measured in every area of human scalp, and its wavelength has a frequency of mainly 30 Hz or below and a potential difference of scores of microvolts. Depending on brain activity and state, various waveforms may appear. A research on interface control using a brain wave signal according to a person's intention is under way. A brain wave signal may be obtained by using EEG (Electro Encephalo Graphy) using electrical signals caused by brain activities, MEG (Magneto Encephalo Graphy) using magnetic signals occurring with electrical signals, and fMRI (functional Magnetic Resonance Imaging) or fNIRS (Near-Infrared Spectroscopy) using a change of oxygen saturation in the blood. Although fMRI and fNIRS are useful techniques for measuring brain activities, fMRI has a low time-resolution and fNIRS has a low spatial-resolution in general. Due to these limitations, EEG signals are mostly used by virtue of excellent portability and time-resolution.

A brain wave signal changes spatially and over time according to brain activity. As a brain wave signal is usually difficult to analyze and its waveform is not easy to visually analyze, various processing methods are proposed.

For example, according to the number of oscillations (frequency), brain wave signals may be classified based on frequency bands (Power spectrum classification). The classification considers a measured brain wave signal as a linear sum of simple signals at each specific frequency, decomposes the signal into each frequency component and indicates a corresponding amplitude. A brain wave signal at each frequency may be obtained by using pre-processing normally for noise elimination, the Fourier transform into frequency domain, and a band-pass filter (BPF).

More particularly, according to frequency band, brain waves may be classified into delta, theta, alpha, beta and gamma waves. Delta waves are brain waves with a frequency of 3.5 Hz or below and an amplitude of 20~200 μV, mainly appearing in normal deep sleep or newborns. In addition, delta waves may increase as our awareness of the physical world decreases. Generally, theta waves are brain waves with a frequency of 3.5~7 Hz, mainly appearing in emotionally stable states or in sleep.

In addition, theta waves are generated mainly in the parietal cortex and in the occipital cortex and may appear during calm concentration for recollecting a memory or meditating. Generally, alpha waves are brain waves with a frequency of 8~12 Hz, mainly appearing in relaxed and comfortable states. In addition, alpha waves are normally generated in the occipital cortex during rest and may diminish in sleep. Generally, beta waves are brain waves with a frequency of 13~30 Hz, mainly appearing in a state of tension, which is bearable enough, or while a certain level of attention is paid. In addition, beta waves are mainly generated in the frontal cortex and are related to an awakened state or concentrated brain activities, pathological phenomena and medicinal effects. Beta waves may appear in a wide area throughout the brain. In addition, specifically, the beta waves may be divided into SMR waves with a frequency of 13~15 Hz, mid-beta waves with a frequency of 15~18 Hz and high beta waves with a frequency of 20 Hz and above. As beta waves appear to be stronger under stress like anxiety and tension, they are called stress waves. Gamma waves are brain waves that generally have a frequency of 30~50 Hz, mainly appearing in a strongly excited state or during high-level cognitive information processing. In addition, gamma waves may appear in an awaking state of consciousness and during REM sleep and may also be overlapped with beta waves.

Each of the brain wave signals according to frequency band is associated with a specific cognitive function. For example, delta waves are associated with sleep, theta waves are associated with working memory, and alpha waves are associated with attention or inhibition. Thus, the property of a brain wave signal at each frequency band selectively displays a specific cognitive function. In addition, the brain wave signal at each frequency band may show a little different aspect in each measuring part on the surface of head. The cerebral cortex may be divided into frontal cortex, parietal cortex, temporal cortex and occipital cortex. These parts may have a few different roles. For example, the occipital cortex corresponding to the back of head has the primary visual cortex and thus can primarily process visual information. The parietal cortex located near the top of head has the somatosensory cortex and thus can process motor/sensory information. In addition, the frontal cortex can process information related to memory and thinking, and the temporal cortex can process information related to auditory sense and olfactory sense.

Meanwhile, for another example, a brain wave signal may be analyzed by using ERP (Event-Related Potential). ERP is an electrical change in a brain in association with a stimulus from outside or a psychological process inside. ERP means a signal including an electrical activity of the brain, which is caused by a stimulus including specific information (for example, image, voice, sound, command of execution, etc.) after a certain time since the stimulus is presented.

To analyze an ERP, a process of separating a signal from a noise is desired. An averaging method may be mainly used. Particularly, by averaging brain waves measured based on stimulus onset time, it is possible to remove brain waves, which are not related to a stimulus, and to pick out only a related potential, that is, a brain activity commonly associated with stimulus processing.

As ERP has a high time resolution, it is closely related to a research on cognitive function. ERP is an electrical phenomenon that is evoked by an external stimulus or is related to an internal state. According to types of stimuli, ERPs may be classified into auditory sense-related potentials, sight-related potentials, somatic sense-related potentials and olfactory sense-related potentials. According to properties of stimuli, ERPs may be classified into exogenous ERPs and endogenous ERPs. Exogenous ERPs have a waveform determined by an external stimulus, are related to automatic processing, and mainly appear in the initial phase of being given the stimulus. For example, exogenous ERPs are brainstem potentials. On the other hand, endogenous ERPs are determined by an internal cognitive process or a psychological process or state, irrespective of stimuli, and are related to 'controlled processing'. For example, endogenous ERPs are P300, N400, P600, CNV (Contingent Negative Variation), etc.

Names given to ERP peaks normally include a polarity and a latent period, and the peak of each signal has an individual definition and meaning. For example, the positive potential is P, the negative potential is N, and P300 means a positive peak measured about 300 ms after the onset of a stimulus. In addition, 1, 2, 3 or a, b, c and the like are applied according to the order of appearance. For example, P3 means a third positive potential in waveform after the onset of a stimulus.

Hereinafter, various ERPs will be described.

For example, N100 is related to a response to an unpredictable stimulus.

MMN (Mismatch Negativity) may be generated not only by a focused stimulus but also by non-focused stimulus. MMN may be used as an indicator for whether or not a sense memory (echoic memory) operates before initial attention. P300, which will be described below, appears in a process of paying attention and making judgment, while MMN is analyzed as a process occurring in the brain before paying attention.

For another example, N200 (or N2) is mainly generated according to visual and auditory stimuli and is related to short-term memory or long-term memory, which are types of memories after attention, along with P300 described below.

For yet another example, P300 (or P3) mainly reflects attention to a stimulus, stimulus cognition, memory search and alleviation of uncertain feeling and is related to perceptual decision distinguishing stimuli from outside. As the generation of P300 is related to a cognitive function, P300 is generated irrespective of types of presented stimuli. For example, P300 may be generated in auditory stimuli, visual stimuli and somatic stimuli. P300 is widely applied to a research on brain-computer interface.

For yet another example, N400 is related to language processing and is caused when a sentence or an auditory stimulus with a semantic error is presented. In addition, N400 is related to a memory process and may reflect a process of retrieving or searching information from long-term memory.

For yet another example, as an indicator showing reconstruction or recollective process, P600 is related to a process of processing a stimulus more accurately based on information stored in long-term memory.

For yet another example, CNV refers to potentials appearing for 200~300 ms and even for a few seconds in the later phase. It is also called slow potentials (SPs) and is related to expectancy, preparation, mental priming, association, attention and motor activity.

For yet another example, ERN (Error-Related Negativity) or Ne (error negativity) is an event-related potential (ERP) generated by a mistake or an error. It may occur when a subject makes a mistake in a sensorimotor task or a similar task. More particularly, when a subject cognizes a mistake or an error, ERN is generated and its negative peak appears mainly in the frontal and central zones for about 50~150 ms. Especially, it may appear in a situation, where a mistake related to motor response is likely to occur, and may also be used to indicate a negative self-judgment.

Hereinafter, the major features of ERN will be described in more detail.

FIG. 1 is a view illustrating a general waveform of ERN according to one form of the present disclosure.

Referring to FIG. 1, negative potential values are depicted above the horizontal axis, and positive potential values are depicted below the horizontal axis. In addition, it can be confirmed that an ERP with a negative peak value is generated within a predetermined time range after a response onset for an arbitrary motion. Herein, the response may mean a case where a mistake or an error is made (Error Response). In addition, the predetermined time range may be about 50~150 ms. Alternatively, the predetermined time range may be about 0~100 ms. Meanwhile, in the case of a correct response, an ERP is generated which has a relatively smaller negative peak than ERN.

As an ERP of initial negativity, ERN is time-locked until a response error occurs. In addition, ERN is known to reflect the reinforcement activity of a dopaminergic system related to behavioral monitoring. ERN includes the fronto-striatal loop including the rostral cingulate zone. Meanwhile, dopamine is associated with the reward system of brain that usually forms a specific behavior and motivates a person thereby providing pleasure and reinforced feelings. When a behavior obtaining an appropriate reward is repeated, it is learned as a habit. In addition, more dopamine is released through emotional learning, and a new behavior is attempted due to the release of dopamine. Thus, reward-driven learning is called reinforcement learning.

In addition, ERN may be generated in 0~100 ms after the onset of an erroneous response that is caused during an interference task (for example, Go-noGo task, Stroop task, Flanker task, and Simon task) through the frontal cortex lead.

In addition, together with CRN described below, ERN is known to reflect a general behavior monitoring system that can distinguish a right behavior and a wrong behavior.

In addition, the fact that ERN reaches a maximum amplitude at the frontal cortex electrode is known to reflect that an intracerebral generator is located in the rostral cingulate zone or the dorsal anterior cingulate cortex (dACC) zone.

In addition, ERN may show a change of amplitude according to a negative emotional state.

In addition, ERN may be reported even in a situation where behavioral monitoring is performed based on external evaluation feedback processing unlike internal motor expression, and may be classified as FRN described below.

In addition, ERN may be generated not only when having cognized a mistake or an error but also before cognizing the mistake or the error.

In addition, ERN may be generated not only as a response to his/her own mistake or error but also as a response to a mistake or error of others.

In addition, ERN may be generated not only as a response to a mistake or an error but also as a response to anxiety or stress for a predetermined performance task or object.

In addition, as a larger peak value of ERN is obtained, it may be considered as reflecting a more serious mistake or error.

Meanwhile, for yet another example, being an event-related potential (ERP) that is generated after ERN, Pe (Error Positivity) is an ERP with a positive value, which is generated mainly at the frontal cortex electrode in about 150~300 ms after a mistake or an error. Pe is known as a reaction that realizes a mistake or an error and pays more attention. In other words, Pe is related to an indicator of a conscious error information processing process after error detection. ERN and Pe are known as ERPs related to error monitoring.

Hereinafter, the major features of Pe will be described in more detail.

Figure 2:
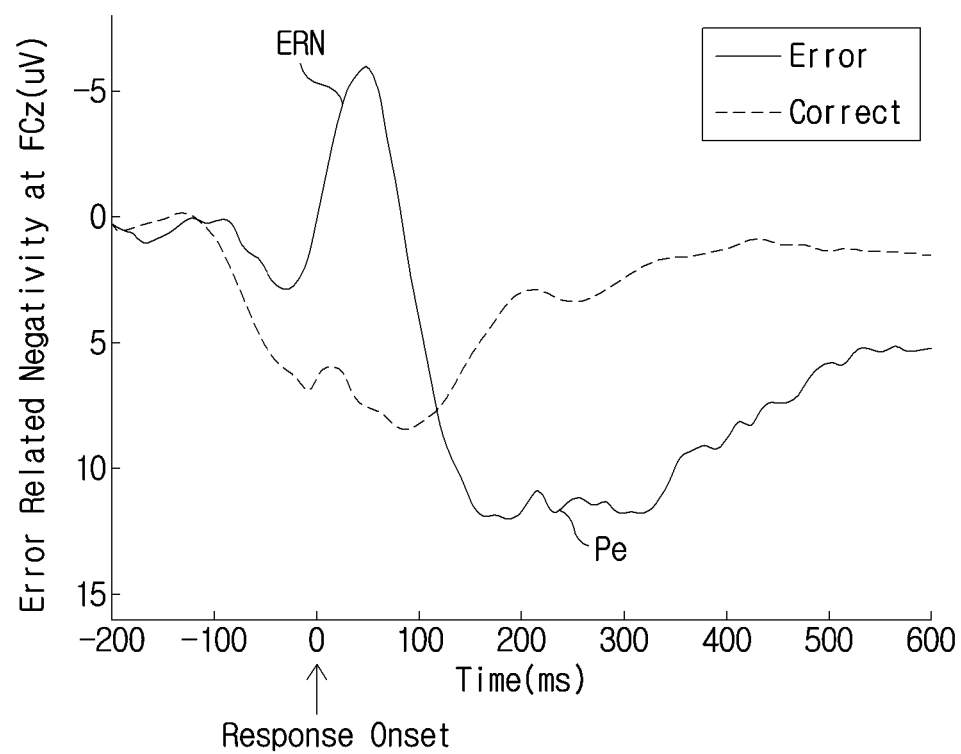
FIG. 2 is a view illustrating general waveforms of ERN and Pe according to one form of the present disclosure.

FIG. 2 is a view illustrating general waveforms of ERN and Pe according to another form of the present disclosure.

Referring to FIG. 2, negative potential values are depicted above positive potential values. In addition, it can be confirmed that an ERP with a negative peak value, that is, an ERN is generated within a first predetermined time range after a response onset for an arbitrary motion. Herein, the response may mean a case where a mistake or an error is made (Error Response). In addition, the first predetermined time range may be about 50~150 ms. Alternatively, the first predetermined time range may be about 0~200 ms.

In addition, it can be confirmed that an ERP with a positive peak value, that is, a Pe is generated within a second predetermined time range after the onset of the ERN. In addition, the second predetermined time range may be about 150~300 ms after an error onset. Alternatively, the second predetermined time range may mean about 200~400 ms.

Figure 3:
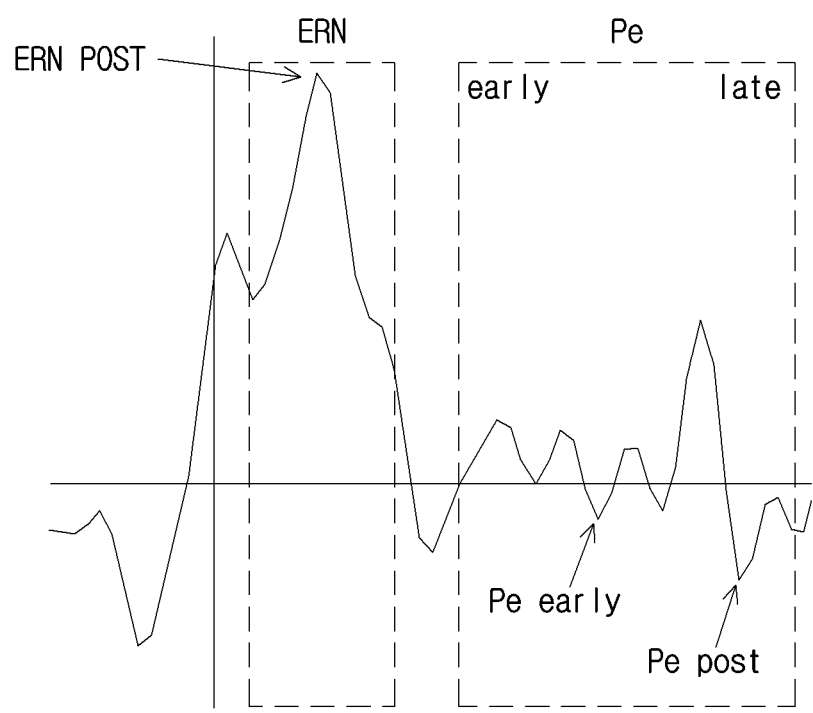
FIG. 3 is a view illustrating a deflection characteristic of Pe according to another form of the present disclosure.

FIG. 3 is a view illustrating a deflection characteristic of Pe in one form of the present disclosure.

Referring to FIG. 3, like P3, Pe has a wide deflection characteristic, and the plexus generator includes not only the areas of posterior cingulate cortex and insula cortex but also more anterior cingulate cortex.

In addition, Pe may reflect an emotional evaluation of an error and an attention to a stimulus like P300. In addition, ERN indicates a conflict between a right response and a wrong response, and Pe is known to be a response that realizes a mistake and pays more attention. In other words, ERN may be generated in a process of detecting a stimulus, and Pe may be generated depending on attention in a process of processing a stimulus. When ERN and/or Pe have relatively large values respectively, it is known that the values are related to an adaptive behavior intended to respond more slowly and more accurately after a mistake.

Figure 4A:
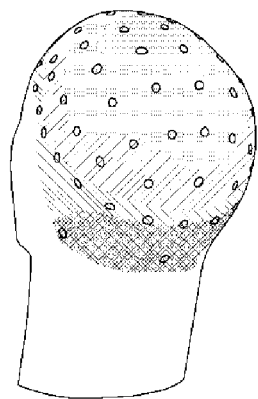
FIGS. 4A and 4B are views respectively illustrating measurement areas of ERP and Pe in one form of the present disclosure.
Figure 4A:
Figure 4B:
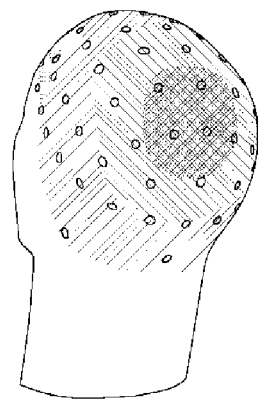
Figure 4B:

FIGS. 4A and 4B are views illustrating measurement areas of ERP and Pe according to one form of the present disclosure.

ERN and Pe are known as ERPs related to error monitoring. Regarding the measurement areas of ERN and Pe, a largest negative value and a largest positive value may normally be measured in the central area. However, there may be a little difference according to measurement conditions. For example, FIG. 4A is the main area where ERN is measured, and the largest negative value of ERN may normally be measured in the midline frontal or central zone (that is, FCZ). In addition, FIG. 4B is the main area where Pe is measured, and a large positive value of Pe may normally be measured in a posterior midline zone as compared to ERN.

Meanwhile, for yet another example, FRN (Feedback-Related Negativity) is an event-related potential (ERP) that is related to error detection obtained based on external evaluation feedback. ERN and/or Pe detect an error based on an internal monitoring process. However, in the case of FRN, when being obtained based on external evaluation feedback, it may operate similarly to the process of ERN.

In addition, FRN and ERN may share many electrophysiological properties. For example, FRN has a negative peak value at the frontal cortex electrode in about 250~300 ms after the onset of a negative feedback and may be generated in the dorsal anterior cingulate cortex (dACC) zone like ERN.

In addition, like ERN, FRN may reflect an activity of reinforcement learning by a dopaminergic system. In addition, FRN normally has a larger negative value than a positive feedback and may have a larger value for an unforeseen case than for a predictable result.

Figure 5:
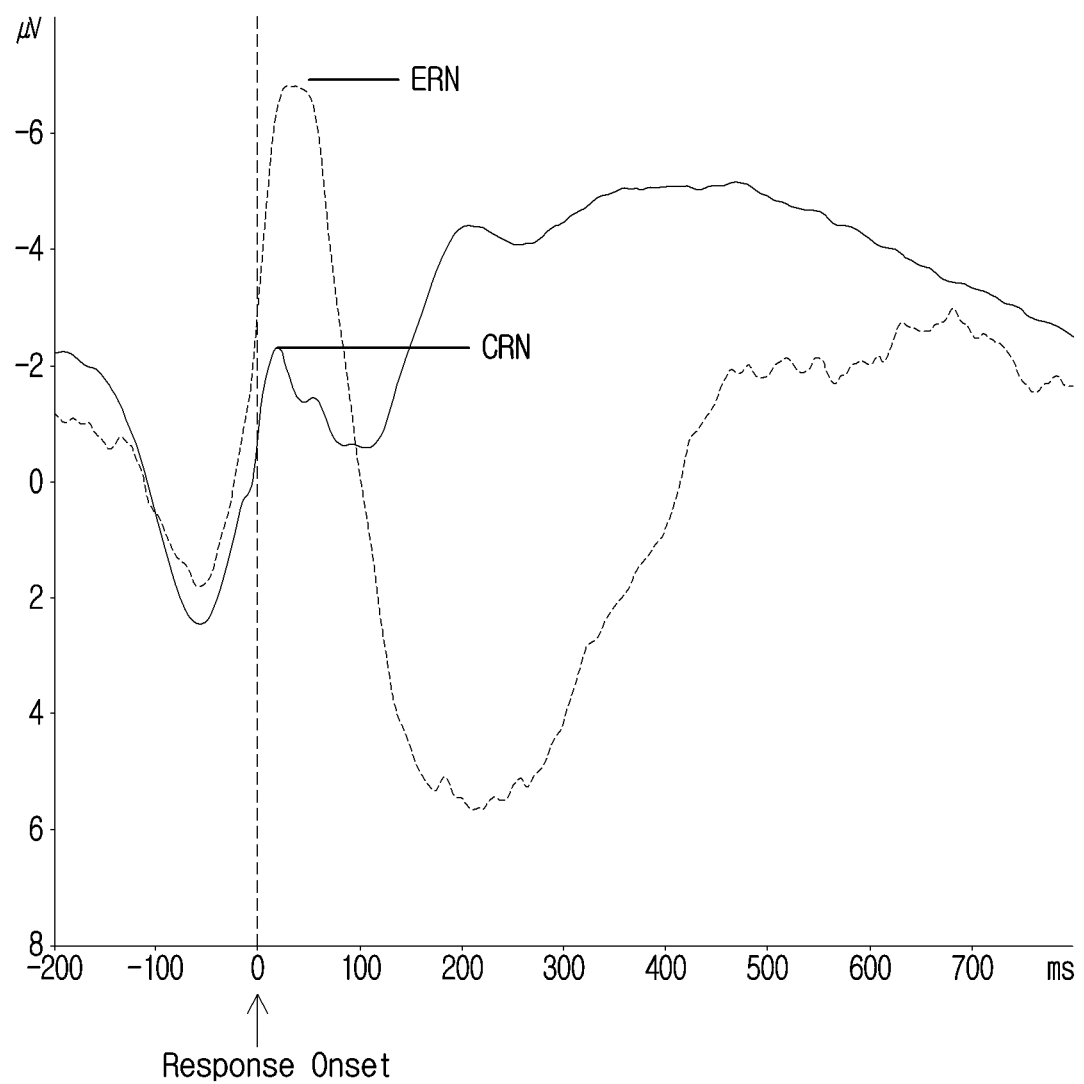
FIG. 5 is a view illustrating general waveforms of ERN and CRN according to one form of the present disclosure.

For yet another example, CRN (Correct-Related Negativity) is an ERP generated by a correct trial and is a negative value that is smaller than ERN. Like ERN, CRN may be generated in the initial latent period (for example, 0~100 ms). FIG. 5 is a view illustrating general waveforms of ERN and CRN in one form of the present disclosure.

For yet another example, Pc (Correct Positivity) is an event-related potential generated following CRN. It is an event-related potential generated in about 150~300 ms after the onset of correct response. The relation between CRN and Pc may be similar to the relation between ERN and Pe.

Meanwhile, ERPs may be classified into stimulus-locked ERPs and response-locked ERPs. The stimulus-locked ERPs and the response-locked ERPs may be divided according to criteria like evoking cause of ERP and response time. For example, an ERP evoked from a moment when a word or a picture is presented to a user from outside may be called a stimulus-locked ERP. In addition, for example, an ERP evoked from a moment when a user speaks or pushed a button may be called a response-locked ERP. Accordingly, based on the above-described criterion, in general, stimulus-locked ERPs are N100, N200, P2, P3, etc., and response-locked ERPs are ERN, Pe, CRN, Pc, FRN, etc.

Meanwhile, brain waves may be classified according to manifesting motives. Brain waves may be classified into spontaneous brain waves (spontaneous potentials) manifested by a user's will and evoked brain waves (evoked potentials) that are naturally manifested according to external stimuli irrespective of the user's will. Spontaneous brain waves may be manifested when a user moves on his/her own or imagines a movement, while evoked brain waves may be manifested by visual, auditory, olfactory and tactile stimuli, for example.

Meanwhile, brain wave signals may be measured in accordance with the International 10-20 system. The International 10-20 system determines measurement points of brain wave signals on the basis of the relationship between the location of an electrode and the cerebral cortex areas.

Figure 6:
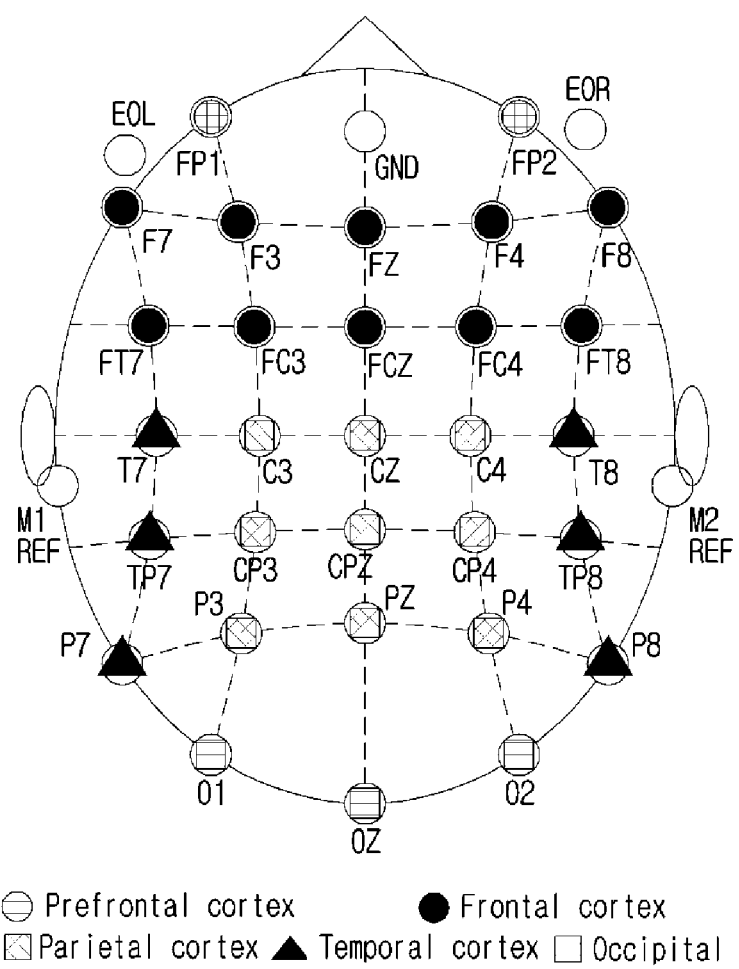
FIG. 6 is a view illustrating EEG measurement channels corresponding to cerebral cortex areas in one form of the present disclosure.

FIG. 6 is a view illustrating EEG measurement channels corresponding to the cerebral cortex areas according to one form of the present disclosure.

Referring to FIG. 6, brain areas (Prefrontal cortex FP1, FP2; Frontal cortex F3, F4, F7, F8, FZ, FC3, FC4, FT7, FT8, FCZ; Parietal cortex C3, C4, CZ, CP3, CP4, CPZ, P3, P4, PZ; Temporal cortex T7, T8, TP7, TP8, P7, P8; Occipital cortex O1, O2, OZ) correspond to 32 brain wave measurement channels. For each of the channels, data may be obtained and analysis may be performed for each cerebral cortex area by using the data.

Figure 7:
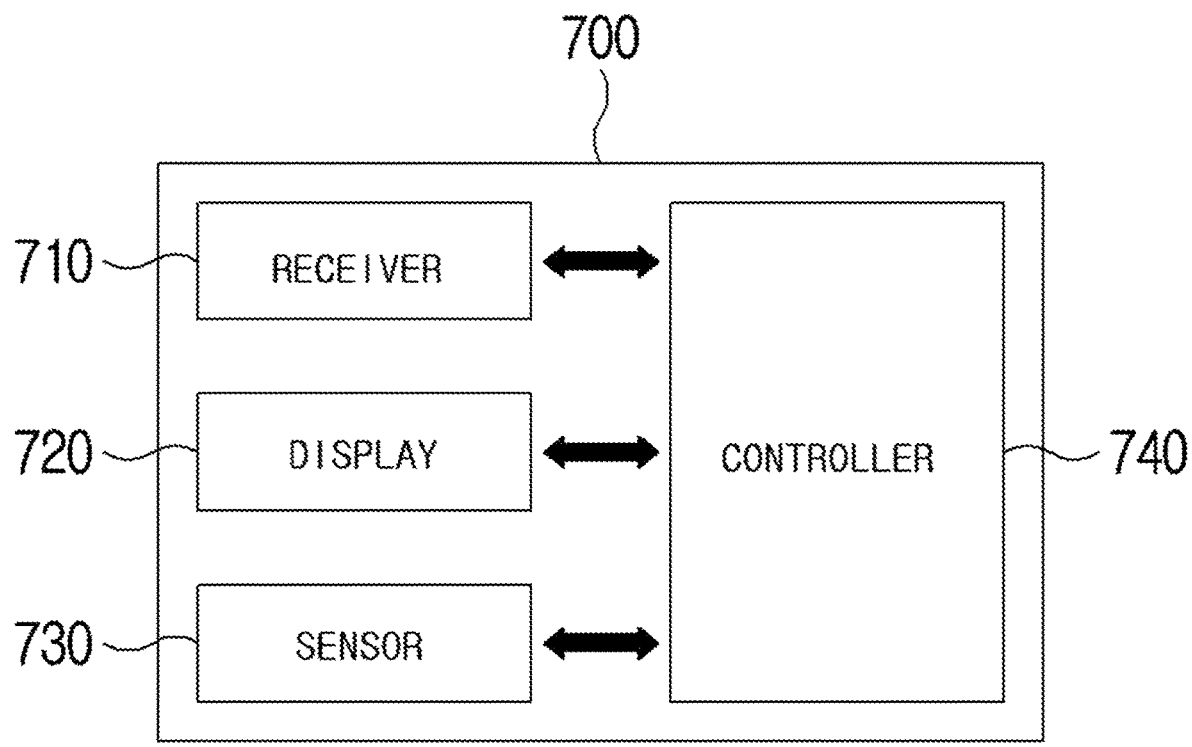
FIG. 7 is a block diagram illustrating a configuration of an apparatus for selecting an item on the basis of a passenger's brain wave signal according to one form of the present disclosure.

FIG. 7 is a block diagram illustrating a configuration of an apparatus for selecting an item on the basis of a passenger's brain wave signal according to one form of the present disclosure.

Drive-through (DT) is a service that allows customers to order, pay and pick up goods in their mobilities, that is, without parking the mobilities. DT is applauded as an efficient and convenient service since customers do not need to park their mobilities and wait in line. Recently, DT services are becoming common. For example, passengers of mobilities can easily use convenient DT services provided by fast food restaurants and coffee shops in a downtown area or on an expressway in everyday life. The mobilities may encompass the meanings of vehicle, moving/transport apparatus and the like.

Meanwhile, a current DT service commonly requires a passenger to come to a place or location where the DT service is provided (hereinafter, 'DT point') and then to order an item. The present disclosure may provide an item selection apparatus and method that allows an item (hereinafter, 'DT item) provided by a DT point to be selected and ordered in a mobility before the mobility arrives at the DT point.

Herein, a DT point may be a place providing a DT service within a predetermined range from a mobility.

In addition, a DT point of the present disclosure may include not only a place providing a DT service but also an office capable of providing a DT item to a mobility, though not providing a DT service, and receiving information on an item that is selected and ordered in the mobility. For example, a DT point of the present disclosure may be an office where a customer in a mobility is able to select and order an item provided by the DT point but has to park/pull over the mobility in a separate place in order to pick up the ordered item. In other words, a DT point of the present disclosure may include a drive-in type office without a drive-through path.

An item selection apparatus of the present disclosure may display a DT item provided by a DT point on a predetermined area in a mobility and select the displayed item by using a passenger's brain wave signal. In addition, an item selection apparatus of the present disclosure may provide information on the selected DT item to the DT point.

Herein, a steady state visually evoked potential (SSVEP) may be used as the passenger's brain wave signal. Herein, an SSVEP is a signal that is a natural response to a visual stimulus having a specific frequency. Generally, when a visual stimulus at a frequency range of 3.5 Hz to 75 Hz is given, a human brain (mainly, the occipital lobe) is electrically activated at a same frequency as the visual stimulus. SSVEP-based research is one type of techniques using the physiological mechanism of a brain wave response. When a user gazes at a light flickering at a specific frequency, this technique utilizes the principle that a synchronized signal with the frequency of the flickering light is detected from a brain wave from the cerebral cortex. In other words, the technique utilizes the principle that a gaze at a specific visual stimulus increases a brain wave power at a same frequency and/or at an integer-multiplied frequency band for a frequency at which the specific visual stimulus flickers. In addition, SSVEP has a good signal-to-noise ratio.

Referring to FIG. 7, an item selection apparatus 700 may include a receiver 710, a display 720, a sensor 730 and/or a controller 740. It should be noted, however, that only some of the components for explaining the present form are shown, and the components included in the item selection apparatus 700 are not limited to the above-described example. For example, two or more constituent units may be implemented in one constituent unit, and an operation performed in one constituent unit may be divided and executed in two or more constituent units. Also, some of the constituent units may be omitted or additional constituent units may be added.

The item selection apparatus 700 of the present disclosure may receive information on at least one item from a service point. In addition, the receiver 710 may perform the operation.

Here, the service point may mean a DT point.

For example, the service point may be a place providing a DT service within a predetermined range from the mobility. Alternatively, when a mobility is within a predetermined range from the service point, the mobility may receive information on the item. The service may vary in its number and type according to the location of a mobility.

Figure 8:
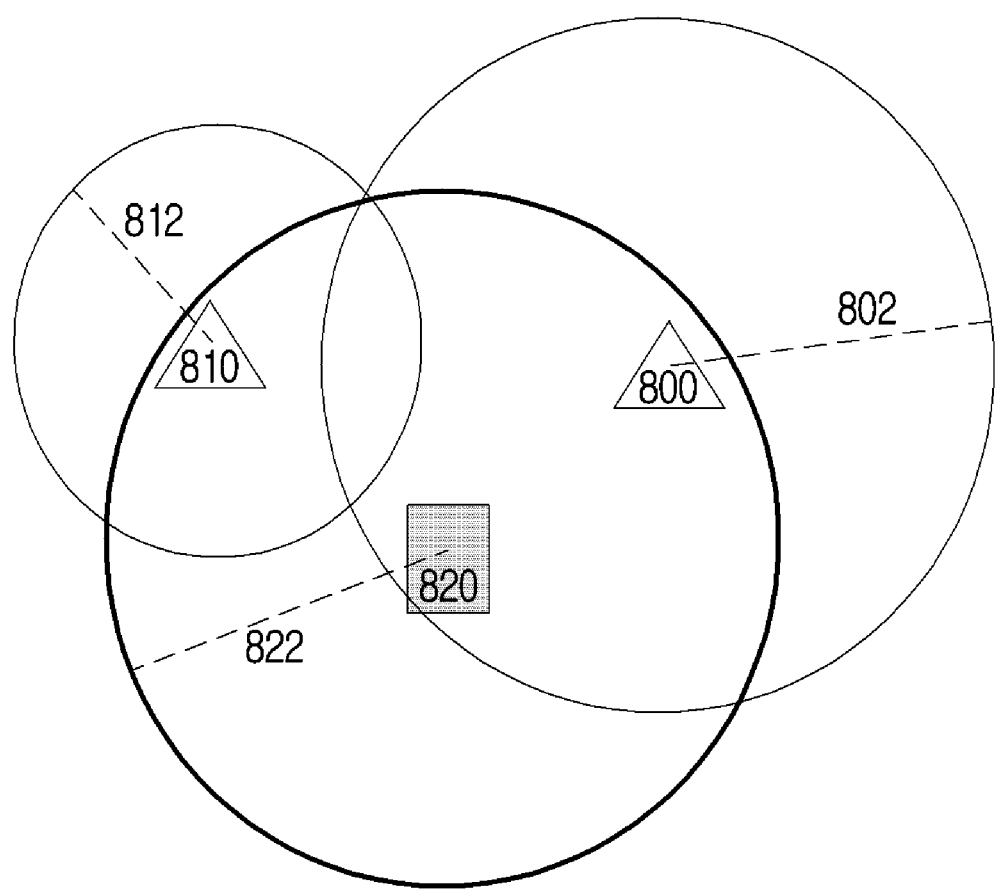
FIG. 8 is a view for explaining a range of transmission and reception between a mobility and a service point according to one form of the present disclosure.

FIG. 8 is a view for explaining a range of transmission and reception between a mobility and a service point according to one form of the present disclosure.

Referring to FIG. 8, in the case of a first service point 800, information on an item provided by the first service point 800 may be transmitted to a mobility 820 within a first range 802 from the first service point 800. On the other hand, in the case of a second service point 810, there is no mobility to which information on an item may be transmitted within a second range 812 from the second service point 810. Alternatively, a mobility 820 may receive information on an item from the first service point 800 and the second service point 810 that are located within a third range 822 from the mobility 820.

For another example, the service point may mean a place input by a user or a preset place of a mobility. Alternatively, the service point may mean a place that is automatically detected according to a predetermined condition in a navigation system of a mobility. The service point may be differently set for each user in a mobility. For example, a service point may be set by each user on the basis of his/her own preference.

For another example, service points may be grouped according to characteristics of places providing services. For example, according to characteristics or types of items and services provided, service points may be grouped into categories like fast food restaurant, coffee shop, bakery, convenience store, bank, ticket office, etc. Based on a mobility passenger's choice, at least one of the grouped lists may be selected. In addition, the grouped lists may be presented on a display of a mobility, and, as a response to the presentation, at least one of the grouped lists may be selected based on a mobility passenger's choice.

Here, the predetermined range may mean a distance of several or dozens of kilometer radius from a mobility and/or a service point. In addition, the predetermined range may be set on the basis of a communications network. For example, when transmission and reception between a mobility and a service point are performed based on a local network, the predetermined range may be a range where the local network enables transmission and reception. Herein, the local network may use a beacon.

Herein, an item may mean a DT item. For example, the item may mean each item like hamburger, coffee and bread. In other words, it may mean an item that a passenger of a mobility wants to purchase.

In addition, the item may include a service provided by a service point.

In addition, the item may include a name, an image and a logo of a service point.

Herein, information on an item may mean information on a DT item.

For example, the information on the DT item may include information on an image, a type, a price, the number and the name of the item.

For another example, the information on the DT item may include predetermined information provided by a service point. For example, it may include information on a new menu, an event, and a discount that are provided by a service point.

For yet another example, the information on the DT item may be set on the basis of a passenger's preference. In this regard, the information on the DT item may be a result of prior learning according to passengers. In addition, the information on the DT item may be updated in real time.

The item selection apparatus 700 of the present disclosure may display information on at least one item received from a service point on a predetermined area of a mobility. In addition, the display 720 may perform the operation.

Here, the predetermined area of the mobility may mean an area that is used to display information on the item in the mobility.

For example, the predetermined area may be a predetermined area within a display that can be projected in a mobility. For example, the predetermined area may be a predetermined area on a front windshield, a side windshield, a rear windshield, and a projection display that is different from the windshields. Alternatively, it may be a predetermined area on a separate head up display (HUD).

For another example, the predetermined area may not be fixed but variable. For example, it may be an area input by a user or a preset area of a mobility. Alternatively, it may be adaptively set by consideration of each passenger's position. In other words, the predetermined area may be set on the basis of each passenger's position. Alternatively, the predetermined area may be set by consideration of whether or not a passenger's gaze will normally stay there while a mobility is running.

For another example, the predetermined area may have different forms and/or sizes according to information on an item. For example, when information on an item is an image, the predetermined area may be circular. Alternatively, when information on an item is the name of the item, the predetermined area may be rectangular. Alternatively, an area displaying information on a first item may be larger than an area displaying information on a second item.

Meanwhile, the item selection apparatus 700 of the present disclosure may display the received information on an item on a predetermined area of a mobility on the basis of a predetermined frequency.

Here, the predetermined frequency may include information on an output frequency, a frequency output pattern, output duration, etc. For example, the item selection apparatus 700 of the present disclosure may display the received information on an item on a predetermined area of a mobility at a predetermined output frequency on the basis of a predetermined frequency output pattern and/or predetermined output duration.

For example, based on a dynamic range of SSVEP, the output frequency may be any frequency within the range of 3.5 Hz to 75 Hz.

For another example, the output frequency may be differently set for each piece of information on an item displayed on a predetermined area. For example, information on a first item may be set to a first frequency, and information on a second item may be set to a second frequency that is different from the first frequency.

For yet another example, the output frequency may be set on the basis of a preset frequency difference. For example, information on a first item may be displayed on a first area by using a first frequency as an output frequency, and information on a second item may be displayed on a second area by adding the frequency difference to the first frequency for an output frequency.

For yet another example, the output frequency may be set on the basis of a whole frequency band. For example, when a whole frequency band is 70 Hz (that is, a range of 5 Hz to 75 Hz), output frequencies for pieces of information on items to be displayed may be set so as to have a largest difference among frequency candidates within the whole frequency band of 70 Hz. The process may enable a whole available frequency band to be maximally utilized.

For another example, the output frequency may be determined based on the number and types of pieces of information on items displayed on a predetermined area.

Herein, a frequency output pattern may mean a pattern of the set frequency displayed on a predetermined area of a mobility, and the frequency output pattern may include a grid, oblique lines, a plural of lines radiating from a central point, a plural of lines passing a single point, for example.

For example, information on an item may be displayed on a predetermined area by using a grid pattern.

For another example, information on an item may be displayed on a predetermined area by using a pattern of oblique and intersecting lines.

Herein, frequency output duration may mean duration for which information on an item is displayed on a predetermined area according to the set output frequency. For example, the frequency output duration may be set according to a type of information on an item, an output frequency, and an output pattern.

Meanwhile, when multiple pieces of information on items are displayed on a predetermined area of a mobility, the pieces of information may have different types. For example, information displayed on a first area may be an image of a first item, and information displayed on a second area may be a price of a second item.

The above-described information on items, display areas, output frequencies (Hz), output patterns and/or output duration may be stored in a form of list shown in Table 1 below.

TABLE 1

| Item | Type of information on item | Display area | Output frequency (Hz) | Output pattern | Output duration |
| --- | --- | --- | --- | --- | --- |
| First item | Image of first item | First area | First frequency | First pattern | First cycle |
| Second item | Image of second item | Second area | Second frequency | Second pattern | Second cycle |
| Third item | Price of third item | Third area | Third frequency | Third pattern | Third cycle |
| Fourth item | Name of fourth item | Fourth area | Fourth frequency | Fourth pattern | Fourth cycle |
| . . . | . . . | . . . | . . . | . . . | . . . |

Referring to Table 1, the item selection apparatus 700 of the present disclosure may display information on an item on a predetermined area of a mobility on the basis of a type of information on an item, a display area, an output frequency, an output pattern, and output duration.

Meanwhile, when there are two or more passengers, the list shown in Table 1 may be different for each passenger.

Figure 9:
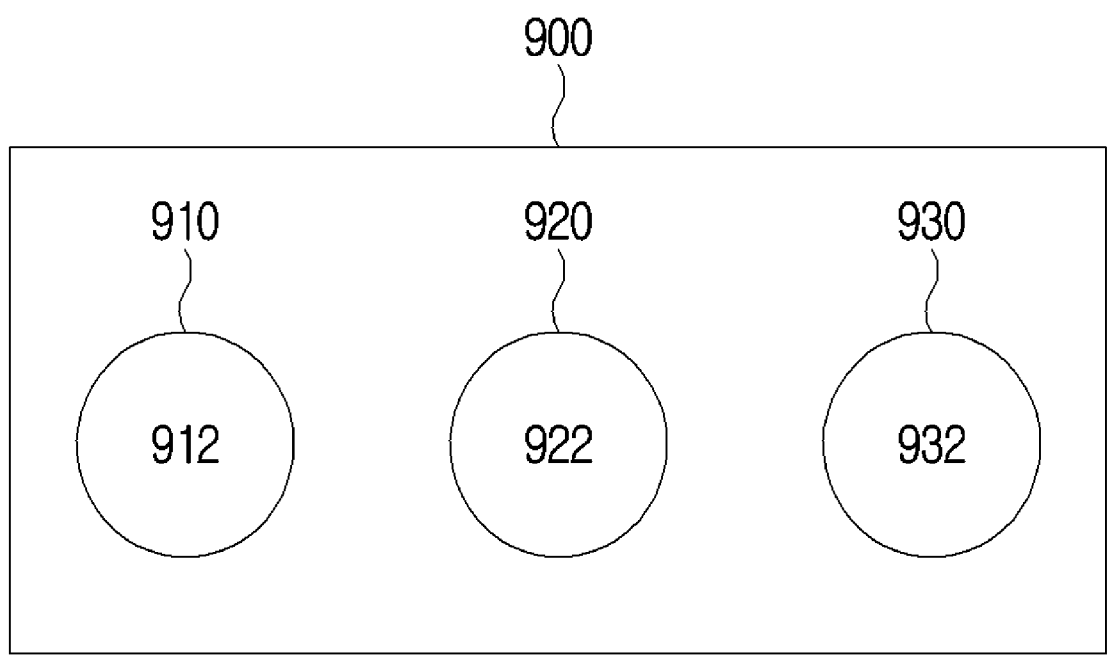
FIG. 9 is a view for explaining one form of displaying information on an item on a predetermined area in a mobility.

FIG. 9 is a view for explaining one form of displaying information on an item on a predetermined area in a mobility.

Referring to FIG. 9, when three pieces of information on items are to be displayed, information on a first item 912 may be displayed on a first area 910, information on a second item 922 may be displayed on a second area 920, and information on a third item 932 may be displayed on a third area 930. In FIG. 9, the first area 910 to the third area 930 are illustrated in a circular form but are not limited thereto, and a certain form of area may be included to display predetermined information.

Also, in FIG. 9, the whole area 900 including the first area 910 to the third area 930 is illustrated as a two-dimensional plane but is not limited thereto, and a curve or a three-dimensional form may be included. In other words, each display area may not be at an equal distance (or depth) from a passenger, and at least one area may be at a different distance.

As a response to information displayed on a predetermined area of a mobility, the item selection apparatus 700 of the present disclosure may collect a brain wave signal for at least one passenger of the mobility for a predetermined time. In addition, the sensor 730 may perform the operation.

Here, the brain wave signal may mean an SSVEP.

In addition, herein, collecting the brain wave signal for a predetermined time may include a process of measuring a brain wave signal of at least one passenger in a mobility and detecting an SSVEP from the measured brain wave signal.

For example, an SSVEP of a passenger gazing at information on an item displayed on a predetermined area of the mobility may be collected.

For another example, a passenger's SSVEP may be collected only at a frequency corresponding to an output frequency displayed on a predetermined area. In other words, when output frequencies are 5 Hz and 17 Hz, frequencies within the respective ranges of 5 Hz and 17 Hz (for example, +/−2 Hz) may be collected. Here, the frequencies may mean powers of frequency bands or SSVEPs within a predetermined range.

For another example, a predetermined frequency with increasing power in a frequency band may be detected, and a visual stimulus corresponding to (or matching) the predetermined frequency may be collected.

For yet another example, a passenger's SSVEP may be collected by determining a similarity to an output frequency displayed on a predetermined area. In other words, a passenger's SSVEP may be collected on the basis of features of the output frequency such as amplitude, shape and duration. Here, the amplitude of the frequency may mean a magnitude of power that is obtained by converting, for example, measured signals by Fourier transform into a frequency band in a frequency domain. For example, a passenger's SSVEP may be collected by considering a magnitude of power (or an amplitude of SSVEP) and/or duration of a specific frequency band (for example, around 5 Hz, 17 Hz, etc.).

Here, the predetermined time may mean a sufficient time for collecting an SSVEP. For example, it may be set on the basis of a type of information on item, a display area, an output frequency, an output pattern, and output duration, as shown in Table 1.

For example, the predetermined time may be proportional to an amplitude change of a minimum frequency among multiple output frequencies.

For another example, the predetermined time may be proportional to output duration.

The item selection apparatus 700 of the present disclosure may determine a passenger's choice by analyzing the collected brain wave signal. In addition, the controller 740 may perform the operation.

Herein, the analysis may include a process of comparing an amplitude of SSVEP, which is collected for the predetermined time, and a predetermined threshold.

Meanwhile, the threshold may be a preset value or a value input by a user. In addition, the threshold may have a different amplitude for each passenger from whom an SSVEP is collected. For example, it may be a value reflecting the brain wave signal characteristic of each passenger. In order to reflect the analysis result of the brain wave signal characteristic, a predetermined learning process may be performed in advance for SSVEP characteristics displayed in a passenger's brain wave signal.

In addition, the analysis may include a process of determining whether or not an amplitude of SSVEP is equal to or greater than a predetermined threshold (that is, exceeds a predetermined threshold range) during a predetermined time interval. For example, in the case of a first frequency, an amplitude of SSVEP may be compared with a first threshold to determine whether or not the amplitude of SSVEP is equal to or greater than the first threshold during a first time range. In the case of a second frequency, an amplitude of SSVEP may be compared with a second threshold to determine whether or not the amplitude of SSVEP is equal to or greater than the second threshold during a second time range.

In addition, the threshold may vary according to an output frequency of SSVEP. For example, in the case of a first frequency, its amplitude may be compared with a first threshold, and, in the case of a second frequency, its amplitude may be compared with a second threshold.

In addition, the analysis may derive a priority order for a passenger's choice by determining a similarity between the collected SSVEP of the passenger and each of at least one output frequency. In other words, a priority order for a passenger's choice may be determined considering features of the output frequency such as amplitude, shape and duration.

For example, information on an item corresponding to a frequency that is equal to or greater than (or exceeds) a predetermined threshold may be determined as a passenger's choice.

For another example, information on an item corresponding to a frequency that has a largest difference from a predetermined threshold may be determined as a passenger's choice.

For yet another example, information on an item corresponding to a frequency that is most similar to an output frequency in features like amplitude, shape and duration may be determined as a passenger's choice.

Meanwhile, the analysis may be preceded by a process of cognizing the onset of an SSVEP by using a time when the characteristic of a brain wave signal appears and/or using the pattern of a brain wave signal. Alternatively, the analysis may be preceded by a process of cognizing the onset of an SSVEP on the basis of a time when the characteristic of a brain wave signal appears and/or through prior learning for a brain wave signal. In addition, the analysis may include a process of extracting an SSVEP.

In addition, an ERP used for the analysis may be a statistical value of SSVEP collected for a predetermined time. For example, the statistical value may mean an average value, a weighted average value, a maximum value, or a minimum value.

As described above, when the SSVEP is used, it may be determined which information is chosen by a corresponding passenger among pieces of information displayed in a mobility. In addition, based on the determination, the mobility may be controlled for a purpose, or a certain piece of information may be transmitted to a service point.

For example, a driving route may be changed to a service point corresponding to the determined choice of a passenger. A guide regarding the changed driving route may be provided to the passenger.

For another example, an additional process may be performed to check whether or not the determined choice of the passenger meets the passenger's intention. In other words, when a passenger's choice is determined, words like 'yes' and 'no' may be displayed on a predetermined area at different output frequencies, and corresponding brain wave signals of a passenger may be analyzed. Thus, a checking process using SSVEPs may be secondarily performed.

For yet another example, an order signal for an item corresponding to the determined choice of the passenger may be transmitted to a corresponding service point. In other words, when the passenger's choice is determined as 'coffee', an order signal for the coffee may be transmitted to a corresponding coffee shop.

Figure 10:
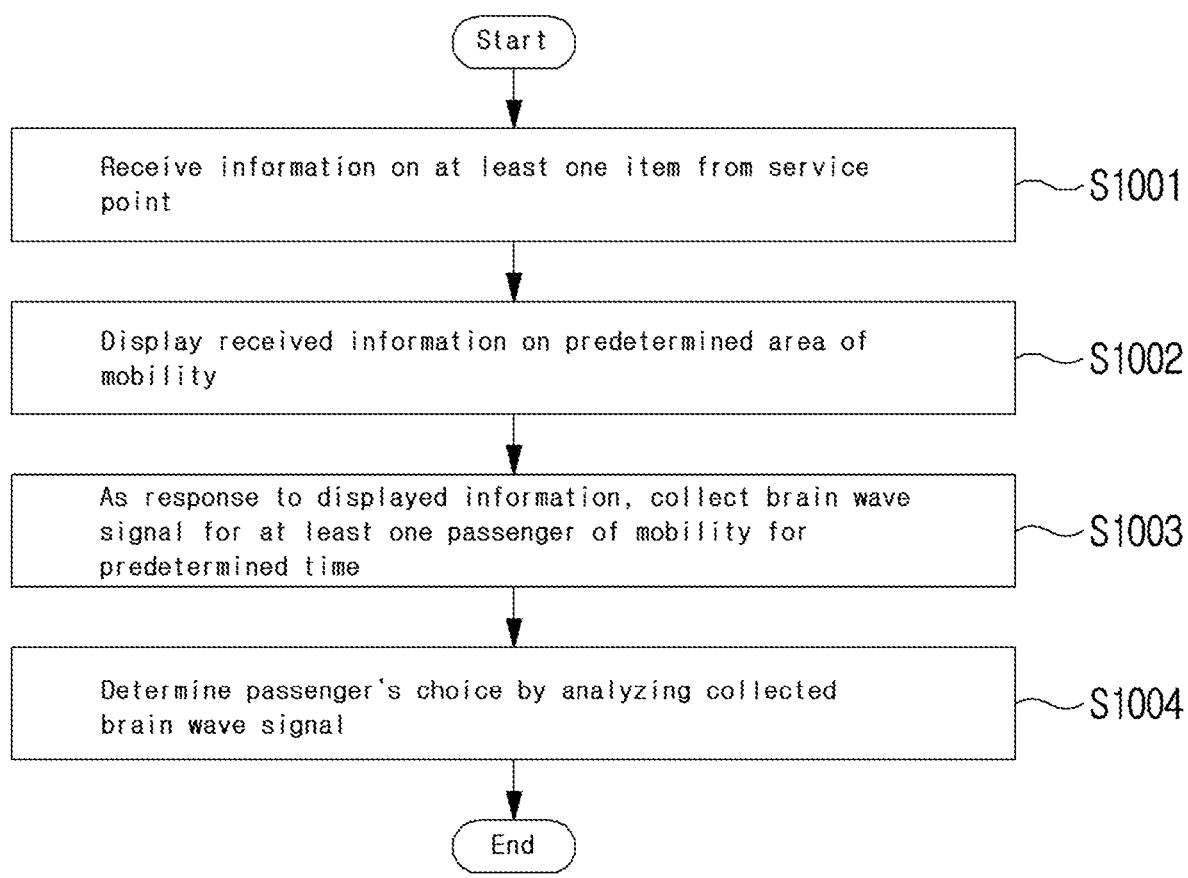
FIG. 10 is a flowchart illustrating a method of operating an item selection apparatus according to one form of the present disclosure.

FIG. 10 is a flowchart illustrating a method of operating an item selection apparatus according to one form of the present disclosure.

In the step S1001, information on at least one item may be received from a service point.

Herein, information on an item may mean information on a DT item. The information on the DT item may include information on an image, a type, a price, the number and the name of the item. The information on the DT item may include predetermined information provided by a service point. For example, it may include information on a new menu, an event, and a discount that are provided by a service point.

In the step S1002, the received information may be displayed on a predetermined area of a mobility.

Here, the predetermined area may be a predetermined area within a display that can be projected in the mobility. For example, the predetermined area may be a predetermined area on a front windshield, a side windshield, a rear windshield, and a projection display that is different from the windshields. Alternatively, it may be a predetermined area on a separate head up display (HUD).

Here, the received information may mean information on an item. For example, the received information may be displayed on a predetermined area of a mobility on the basis of a user input, a preset order in the mobility and/or an order of receiving information on items.

In addition, meanwhile, the received information on items may be displayed on a predetermined area of a mobility on the basis of a predetermined frequency. Here, the predetermined frequency may include information on an output frequency, a frequency output pattern, output duration, etc.

In the step S1003, as a response to the displayed information, a brain wave signal for at least one passenger of the mobility may be collected for a predetermined time.

Here, the brain wave signal may mean an SSVEP. An SSVEP of a passenger gazing at information on an item displayed on a predetermined area of the mobility may be collected. Herein, a passenger's SSVEP may be collected only at a frequency corresponding to an output frequency displayed on a predetermined area.

In the step S1004, the passenger's choice may be determined by analyzing the collected brain wave signal.

Herein, the analysis may include a process of comparing an amplitude of SSVEP, which is collected for the predetermined time, and a predetermined threshold. In addition, the analysis may include a process of determining whether or not an amplitude of SSVEP is equal to or greater than a predetermined threshold (that is, exceeds a predetermined threshold range) during a predetermined time interval. In addition, the analysis may derive a priority order for a passenger's choice by determining a similarity between the collected SSVEP of the passenger and each of at least one output frequency.

Figure 11:
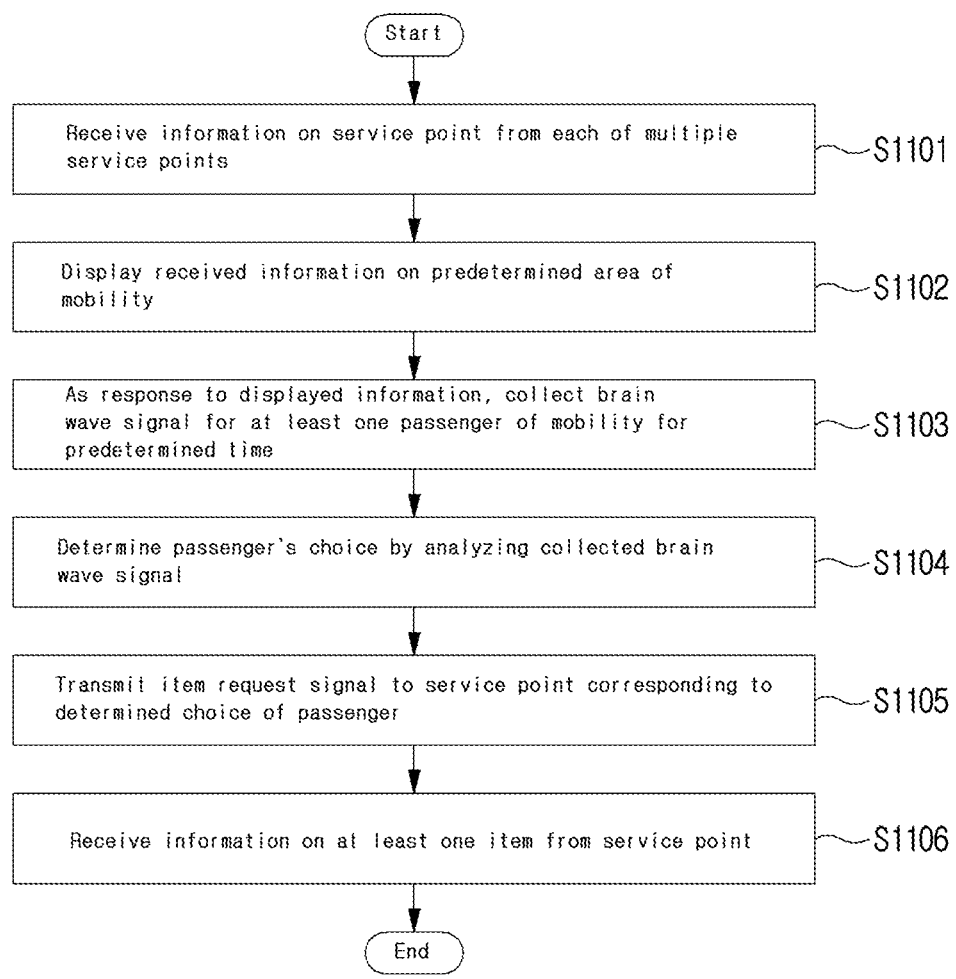
FIG. 11 is a flowchart illustrating a method of operating an item selection apparatus according to another form of the present disclosure.

FIG. 11 is a flowchart illustrating a method of operating an item selection apparatus according to another form of the present disclosure.

When there are multiple service points around a mobility, it is desired to select a service point before ordering an item that a passenger of the mobility wants.

In the step S1101, information on a service point may be received from each of multiple service points.

Here, the information on a service point may include a name, an image and a logo of the corresponding service point and may be included in information on an item.

In the step S1102, the received information may be displayed on a predetermined area of a mobility. In the step S1103, as a response to the displayed information, a brain wave signal for at least one passenger of the mobility may be collected for a predetermined time. In the step S1104, the passenger's choice may be determined by analyzing the collected brain wave signal. Since the steps S1102 to S1104 may correspond to the steps S1002 to S1004 of FIG. 10 respectively, a detailed process is the same as described in FIG. 10.

In the step S1105, an item request signal may be transmitted to a service point corresponding to a determined choice of a passenger.

The passenger's choice that is determined in the step S1104 may correspond to a predetermined service point. Accordingly, in order to receive information on an item provided by the corresponding service point, an item request signal may be transmitted to the service point.

In the step S1106, information on at least one item may be received from the service point.

The subsequent process will be the same as described in FIG. 10.

Figure 12:
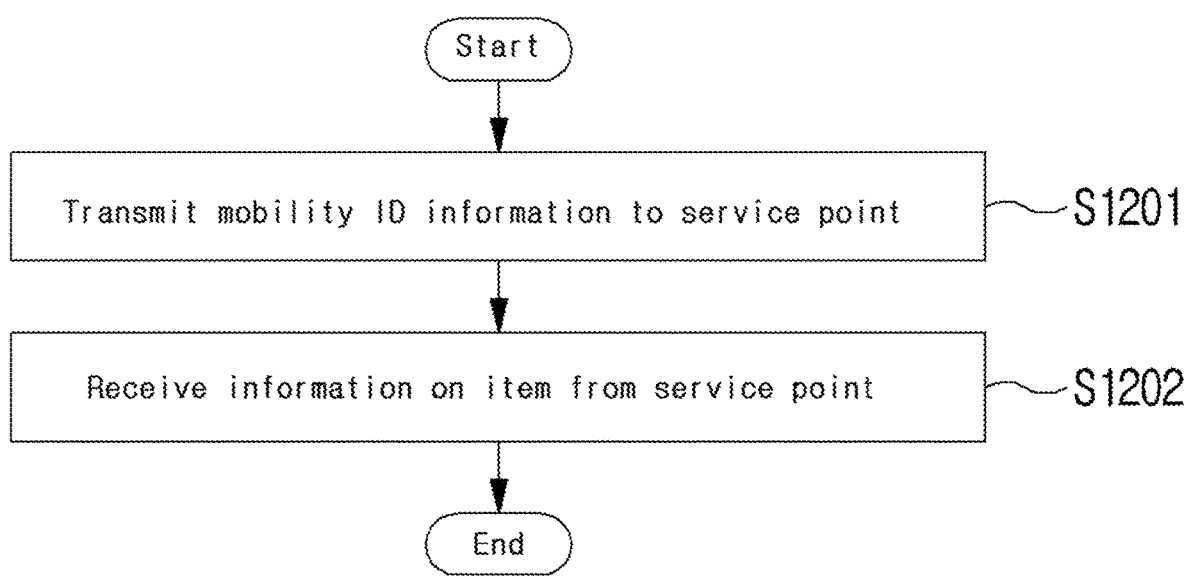
FIG. 12 is a flowchart illustrating a method of operating an item selection apparatus according to yet another form of the present disclosure.

FIG. 12 is a flowchart illustrating a method of operating an item selection apparatus according to yet another form of the present disclosure.

Customized item information may be provided using a passenger's preference, a purchase history and other information.

In the step S1201, mobility identification (ID) information may be transmitted to a service point.

Here, the mobility ID information may mean information that enables a mobility or a passenger of the mobility to be identified. Alternatively, it may mean identification information for a mobility allocated by a corresponding service point or a passenger of the mobility.

For example, the mobility ID information may include such information as a passenger's order details, an order frequency for an item, a recent ordered item, an item ordered according to particular weathers/seasons, etc. Alternatively, information like the order details may be extracted from a corresponding service point by using the mobility ID information.

In the step S1202, information on an item may be received from the service point. Herein, the information on the item may be information that is processed according to the transmitted mobility ID information. In other words, it may not information that a service point commonly transmits to any mobility but information reflecting a passenger's preference, a recent purchase history, etc.

The subsequent process will be the same as described in FIG. 10.

According to the present disclosure, an apparatus and method for selecting an item on the basis of a passenger's brain wave signal may be provided.

In addition, according to the present disclosure, an apparatus and method for selecting an item on the basis of a passenger's SSVEP may be provided.

Effects obtained in the present disclosure are not limited to the above-mentioned effect, and other effects not mentioned above may be clearly understood by those skilled in the art from the following description.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various forms of the present disclosure are not presented to describe all of available combinations but are presented to describe only representative combinations. Steps or elements in various forms may be separately used or may be used in combination.

In addition, various forms of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various forms to be executed in an apparatus or on a computer, and a non-transitory computer-readable medium storing such software or machine-executable instructions so that the software or instructions can be executed in an apparatus or on a computer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for selecting an item using a brain wave signal, the apparatus comprising:
    a receiver configured to receive information on at least one item from a service point;
    a display configured to display the received information on a predetermined area in a mobility;
    in response to the displayed information, a sensor configured to collect a brain wave signal for at least one passenger in the mobility for a predetermined time; and
    a controller configured to analyze the collected brain wave signal and determine a choice of the at least one passenger,
    wherein the display is configured to display the received information on an item on the predetermined area in the mobility based on a predetermined frequency including information on output frequency, and
    wherein the output frequency is differently set according to the received information on the item displayed on the predetermined area.

2. The apparatus of claim 1,
    wherein the collected brain wave signal comprises a steady-state visually evoked potential (SSVEP).

3. The apparatus of claim 1,
    wherein the service point is a place located within a predetermined range from the mobility and provides a driver through (DT) service.

4. The apparatus of claim 1,
    wherein the received information on the at least one item includes at least one of an image of item, a type of item, a price of item, a number of items, a name of item, a new menu, an event, and a discount, which are provided by the service point.

5. The apparatus of claim 1,
    wherein the predetermined area is a predetermined area within the display capable of being projected in the mobility.

6. The apparatus of claim 1,
    wherein at least one of a form or a size of the predetermined area is determined based on the received information on the at least on item.

7. The apparatus of claim 1,
    wherein the predetermined area is determined based on at least one of a position of the at least one passenger or a position of a gaze of the at least one passenger while the mobility is running.

8. The apparatus of claim 1,
    wherein the controller is configured to control the mobility or transmit predetermined information to the service point based on the determined choice of the at least one passenger.

9. The apparatus of claim 1,
    wherein the controller is further configured to determine whether the determined choice of the at least one passenger meets an intention of the at least one passenger.

10. A method for selecting an item using a brain wave signal, the method comprising:
    receiving, by a receiver, information on at least one item from a service point;
    displaying, by a display, the received information on a predetermined area in a mobility;
    in response to the displayed information, collecting, by a sensor, a brain wave signal for at least one passenger in the mobility for a predetermined time; and
    determining, by a controller, a choice of the at least one passenger by analyzing the collected brain wave signal,
    wherein displaying the received information on the predetermined area comprises displaying the received information on an item on the predetermined area in the mobility based on a predetermined frequency including information on output frequency, and
    wherein the output frequency is differently set according to the received information on the item displayed on the predetermined area.

11. The method of claim 10,
    wherein the collected brain wave signal comprises a steady-state visually evoked potential (SSVEP).

12. The method of claim 10,
    wherein the service point is a place located within a predetermined range from the mobility and provides a driver through (DT) service.

13. The method of claim 10,
    wherein the received information on the at least one item includes at least one of an image of item, a type of item, a price of item, a number of items, a name of item, a new menu, an event, or a discount, which are provided by the service point.

14. The method of claim 10,
    wherein the predetermined area is a predetermined area within the display capable of being projected in the mobility.

15. The method of claim 10,
wherein at least one of a form or a size of the predetermined area is determined based on the received information on the at least one item.

16. The method of claim 10,
wherein the predetermined area is determined based on at least one of a position of the at least one passenger or a position of a gaze of the at least one passenger while the mobility is running.

17. The method of claim 10, further comprising:
based on the determined choice of the at least one passenger, controlling the mobility or transmitting predetermined information to the service point.

18. The method of claim 10, further comprising:
determining whether the determined choice of the at least one passenger meets an intention of the at least one passenger.

* * * * *